US012057033B2

(12) United States Patent
Struhl et al.

(10) Patent No.: US 12,057,033 B2
(45) Date of Patent: Aug. 6, 2024

(54) FRAME SIGN SUPPORT

(71) Applicant: SmartSign LLC, Brooklyn, NY (US)

(72) Inventors: Clifford Struhl, Syosset, NY (US); Raymond M. Schneider, Lodi, CA (US)

(73) Assignee: SmartSign LLC, Brooklyn, NY (US)

( * ) Notice: Subject to any disclaimer, the term of this patent is extended or adjusted under 35 U.S.C. 154(b) by 0 days.

(21) Appl. No.: 18/244,482

(22) Filed: Sep. 11, 2023

(65) Prior Publication Data

US 2024/0005822 A1 Jan. 4, 2024

Related U.S. Application Data

(63) Continuation of application No. 17/428,157, filed as application No. PCT/US2020/015622 on Jan. 29, 2020, now Pat. No. 11,790,813.

(60) Provisional application No. 62/800,755, filed on Feb. 4, 2019.

(51) Int. Cl.
*G09F 15/00* (2006.01)

(52) U.S. Cl.
CPC ...... *G09F 15/0031* (2013.01); *G09F 15/0012* (2013.01); *G09F 15/0018* (2013.01); *G09F 15/0062* (2013.01); *G09F 15/0068* (2013.01)

(58) Field of Classification Search
CPC ............. G09F 15/0031; G09F 15/0012; G09F 15/0018; G09F 15/0062; G09F 15/0068
See application file for complete search history.

(56) References Cited

U.S. PATENT DOCUMENTS

| | | | | | | |
|---|---|---|---|---|---|---|
| 4,253,260 | A | * | 3/1981 | Maza | G09F 15/0062 | 116/63 P |
| 4,298,186 | A | * | 11/1981 | Glass | E01F 13/02 | 256/64 |
| 4,796,369 | A | * | 1/1989 | Hamann | E01F 9/688 | 116/63 P |
| 4,928,415 | A | * | 5/1990 | Walters | E01F 9/688 | 40/610 |
| 4,974,815 | A | * | 12/1990 | Glass | E01F 13/02 | 256/64 |
| 4,999,937 | A | * | 3/1991 | Bechtold | E01F 9/688 | 16/329 |
| 5,046,885 | A | * | 9/1991 | Thurston | E01F 13/02 | 116/63 P |
| 5,358,762 | A | * | 10/1994 | McGrath | G09F 15/0062 | 40/610 |
| 5,964,053 | A | * | 10/1999 | Liu | G09F 15/0062 | 116/63 P |

(Continued)

FOREIGN PATENT DOCUMENTS

| | | | |
|---|---|---|---|
| JP | 2017-134202 | A | 8/2017 |
| KR | 2016-0118601 | A | 10/2016 |
| WO | 2018/145741 | A1 | 8/2018 |

OTHER PUBLICATIONS

"Sidewalk Signs-Buyers Guid" SmartSign; Jun. 2019 <https://web.archive.org/web/20190621050846/https://www.smartsign.com/sidewalk-sign-corrarison>.

*Primary Examiner* — Gary C Hoge
(74) *Attorney, Agent, or Firm* — Dilworth & Barrese, LLP

(57) ABSTRACT

The present invention is directed to an improved A-frame support for displaying signs, together with a hinge for outwardly-pivoting the A-frame support and a device for bracing the A-frame support in outwardly-pivoted, open position.

9 Claims, 16 Drawing Sheets

(56) References Cited

U.S. PATENT DOCUMENTS

| | | | | |
|---|---|---|---|---|
| 6,131,320 | A * | 10/2000 | Eberle | G09F 15/0062 40/606.19 |
| 9,286,814 | B1 * | 3/2016 | Thomaselli | G09F 15/00 |
| 2004/0232304 | A1 * | 11/2004 | Wakura | G09F 15/0062 248/456 |
| 2006/0032098 | A1 * | 2/2006 | Glass | G09F 15/0062 40/610 |
| 2007/0284490 | A1 | 12/2007 | Cox | |
| 2008/0216370 | A1 * | 9/2008 | Glass | G09F 15/0062 40/606.01 |
| 2009/0158628 | A1 | 6/2009 | Ashley | |
| 2009/0183409 | A1 * | 7/2009 | Thomas | G09F 15/0062 40/610 |
| 2011/0239506 | A1 * | 10/2011 | Glass, Jr. | G09F 15/0062 40/606.01 |
| 2013/0050060 | A1 * | 2/2013 | Ranger | G09F 15/0062 345/1.1 |
| 2013/0207061 | A1 | 8/2013 | Montgomery et al. | |
| 2018/0186615 | A1 * | 7/2018 | Randall | B66F 13/00 |
| 2019/0392738 | A1 * | 12/2019 | Topcuoglu | G09F 15/0062 |
| 2021/0304645 | A1 * | 9/2021 | Owen | G09F 15/0012 |

* cited by examiner

FRAME SIGN SUPPORT

BACKGROUND OF THE INVENTION

The present invention is directed to an A-frame support or sign stand having improved stability and weathering, in addition to being easier to manufacture and assemble, and more securely retaining a sign or display in versatile manner.

A-frame supports or sign stands have been used to display signs such as advertising, in particular in sidewalk displays. These sign stands have generally been manufactured from metal or wood, although plastic A-frames have come into use. The hardware forming the A-frames is generally exposed, without hidden hinges (thus subject to wear and impact). Furthermore, signs on such A-frame supports or stands are not easily changed. These A-frame sign stands do not have retainers to keep the A-frames open and prevented from inadvertently closing, and also maintaining the frames in closed position, e.g., for transporting.

It has often been difficult to move such A-frame sign stands to different locations, because these sign stands do not have provision to allow rolling of the A-frame in opened condition. Thus, it has been necessary to fold the sign stand closed and then lift and carry the folded stand to a different location. Furthermore, the sides of the A-frames have flat surfaces, limiting visibility of the signs mounted thereon from a sideways direction. Additionally, plastic A-frame sign stands are prone to bowing, warping and twisting, due to the stand legs being formed with thin, flat parallel faces. Furthermore, the flat surfaces do not recess the sign mounted thereon for added support.

These A-frame sign stands or supports are subject to wear and tear, especially when situated outside, and can be easily tipped over, e.g., by rain or wind. At the same, time, these A-frame supports or sign stands have been complicated to assemble and secure a sign thereto, requiring a number of different cumbersome components which could get lost. It has not been easy to open, close and transport a such A-frame supports or sign stands as needed. Furthermore, manufacturing of such components ultimately-forming the A-frame support or sign stand has often been cumbersome and complicated. Moreover, viewing of the sign itself mounted upon the A-frame stand or support is often obscured.

Accordingly, it is desirable to provide an improved A-frame sign support that overcomes deficiencies in the prior art.

SUMMARY OF THE INVENTION

Accordingly, it is an object of the present invention to improve display of signs and other indicia mounted upon an A-frame support.

It is also an object of the present invention to improve assembly and disassembly of an A-frame support into opened or closed condition.

It is furthermore an object of the present invention to improve manufacturing of an A-frame support that will better withstand various displaying conditions and factors, also improving ease of manufacturing while conserving energy and raw materials.

These and other objects are attained by the present invention which is directed to an A-frame sign stand or support for a sign or display, and having two separate panels couplable to one another, each panel having a curved surface arranged to face away from the other panel when the panels are coupled together, means for securing a sign or display to each curved surface of said panels, and means for securing the panels in fixed position with respect to one another. The present invention is also directed to a hinge for coupling and securing two panels in A-frame configuration together, and a device for bracing outwardly-pivoted panels of an A-frame support with respect to one another.

The A-frame support of the present invention is easy to assemble and secure in opened condition and at a variety of acute angles. Viewing the sign or display itself mounted on the A-frame support is improved, in that the sign or display can be clearly viewed from various directions, other than directly head on. The various structural elements forming the A-frame support are each integrally-formed, e.g., from molded plastic, minimizing number of components which could get lost. Assembly and disassembly into opened and closed conditions is facilitated, with the arrangement of coupling devices and braces. At the same time, stability of the assembled A-frame sign stand or support is improved, especially under unfavorable weather condition. The A-frame support can be closed and easily transported for further use. Warping or unwanted flexing of components forming the A-frame sign stand or support is minimized.

In particular, the legs or panels forming the A-frame sign stand or support are identical and include features at the tops thereof arranged to mate with one another when the legs or panels are placed back to back. The bottom end of these legs or panels have receptacles for receive wheels which can be clipped therein; other means of attaching wheels to the panels are contemplated. A handle is provided at the top of each leg or panel, with the handles aligning when the legs or panels are hinged together. At the same time, the hinges at the top of the panels allow the legs or panels to be easily pivoted outwardly to form the A-frame display. The hinges align raised portions at the top of one of the panels with recessed portions at the top of the other panel, so the legs or panels can be pivotally coupled together. In particular, the hinge pin registers the raised and recessed portions when inserted to couple the legs or panels together, allowing the legs or panels to be pivoted outwardly.

The structural ribs of each leg or panel form arches and curves along multiple planes to create a rigid and stationary structure when the A-frame stand is opened. Cutouts or openings through each panel or leg increase effectiveness of the ribs by creating more support surface between the faces for increased stability, also reducing unnecessary material along with weight and cost.

The side support arm or brace is positioned to couple and maintain the A-frame legs or panels in open, expanded condition, and prevent the sign faces from bowing, in addition to preventing the panels or legs from inadvertently folding due to, e.g., wind, impact, etc. These braces or support arms are designed to prop open the A-frame stand at a specific angle, and also keep the handles at the top of each leg or panel in contact for added stability. In particular, these side support arms or braces maintain the A-frame stand in opened position when being wheeled or rolled.

Other embodiments of the invention will be apparent from the drawings and the specification to follow and the scope of the invention will be indicated in the claims.

BRIEF DESCRIPTION OF THE DRAWINGS

The present invention will be described in greater detail with reference to the accompanying drawings in which.

Throughout the disclosure, like reference numerals will be used to indicate similar elements.

DESCRIPTION OF THE PREFERRED EMBODIMENTS

The present disclosure may be understood more readily by reference to the following detailed description, taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments, by way of example only, and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. In particular, they are intended to refer to the spatial reference of the display stand in its normal, assembled configuration during intended use.

The A-frame sign support according to the present disclosure will now be described with respect to the drawings.

Figure 1:
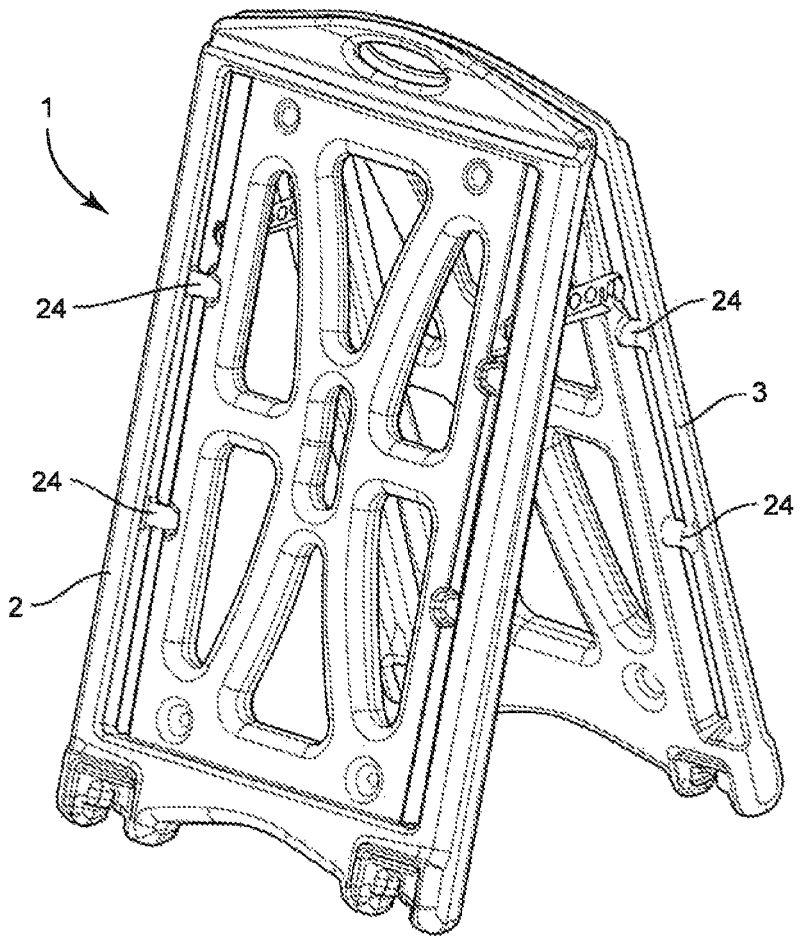
FIG. 1 is a perspective view illustrating an A-frame support in accordance with the present invention in outwardly-pivoted, opened position.
Figure 2:
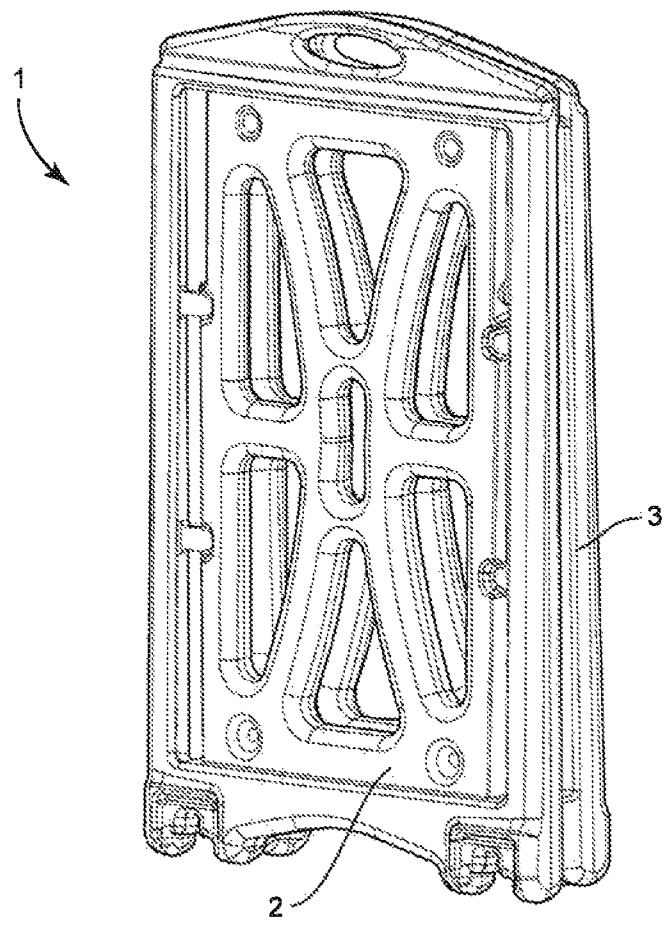
FIG. 2 is a perspective view similar to FIG. 1 and illustrating the A-frame support in inwardly-pivoted, closed position.
Figure 3:
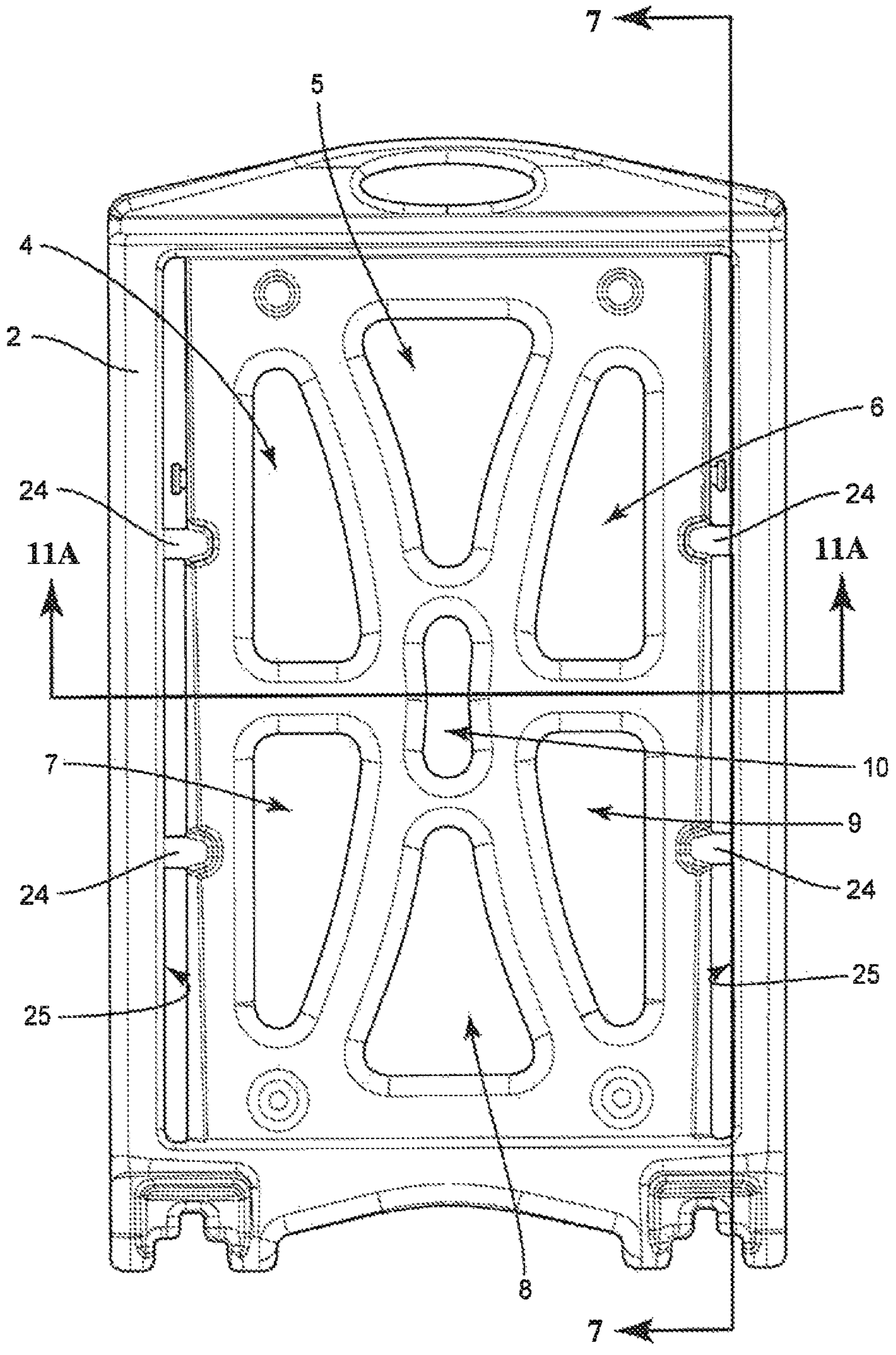
FIG. 3 is a front elevational view of a panel forming the A-frame support shown in FIG. 1.
Figure 4:
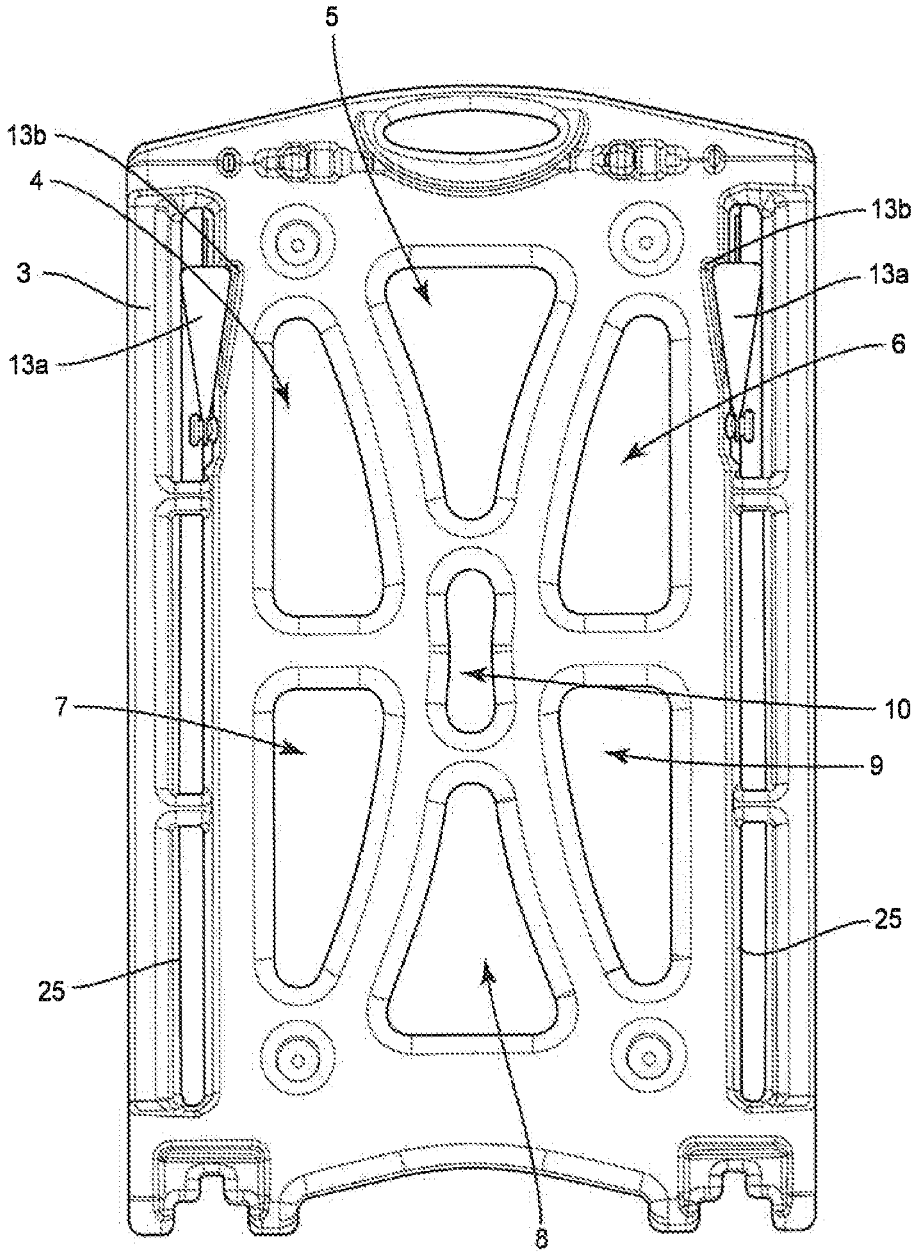
FIG. 4 is a rear elevational view of the panel shown in FIG. 3.

Referring to the drawings, the A-frame support 1 according to the present invention is formed by two panels 2 and 3 being coupled together at the tops thereof and angled outwardly towards the bottoms thereof as shown, e.g., in FIG. 1. The panels 2 and 3 can be pivoted together as illustrated in FIG. 2 when not in use. Each outer surface of each panel is configured to support a sign or display positioned and secured thereon. This surface comprises alternating ridges and grooves positioned to form a corrugated support for a sign or display positioned thereon, with the ridges forming a curved support surface for receiving and supporting a sign or display in outwardly bowed position (FIGS. 11A, 11B and 12).

These grooves 4-10 can form holes extending entirely through each panel 2 or 3, there preferably being a total of nine holes through each panel 2 or 3, namely a central oblong-shaped hole 10, two flared, triangularly-shaped holes 5 and 8 above and below each central hole 10 and pointed to the central hole 10, four aileron-shaped holes 4, 6, 7, 9, with two aileron-shaped holes positioned on either side of a respective triangularly-shaped hole and pointed opposite to the pointing direction of the adjacent triangularly-shaped hole, and a series of narrow rectangularly-extending holes 24, 25 each extending along all the other holes 4-10 at an outer edge thereof as illustrated in FIGS. 1-4, 8, 9, 11A, 11B and 12.

Figure 5:
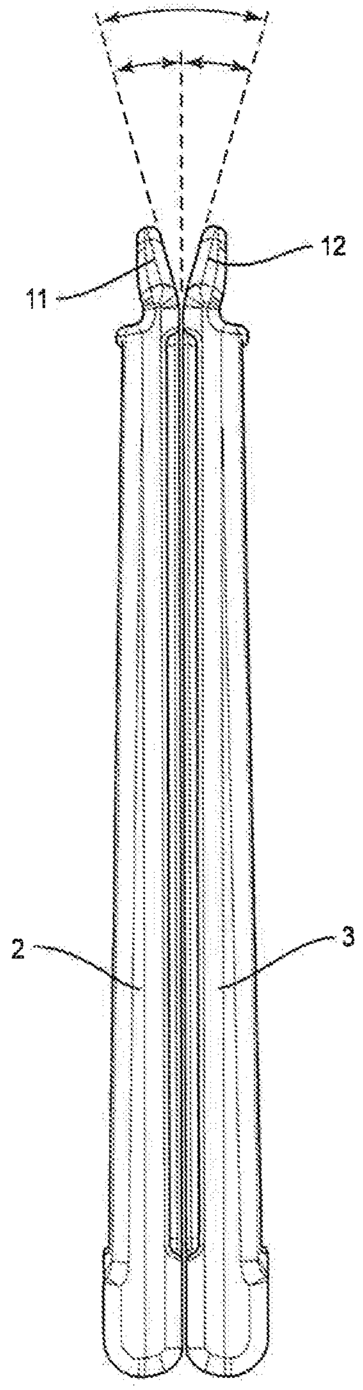
FIG. 5 is a side elevational view of the A-frame support in closed position shown in FIG. 2.
Figure 6:
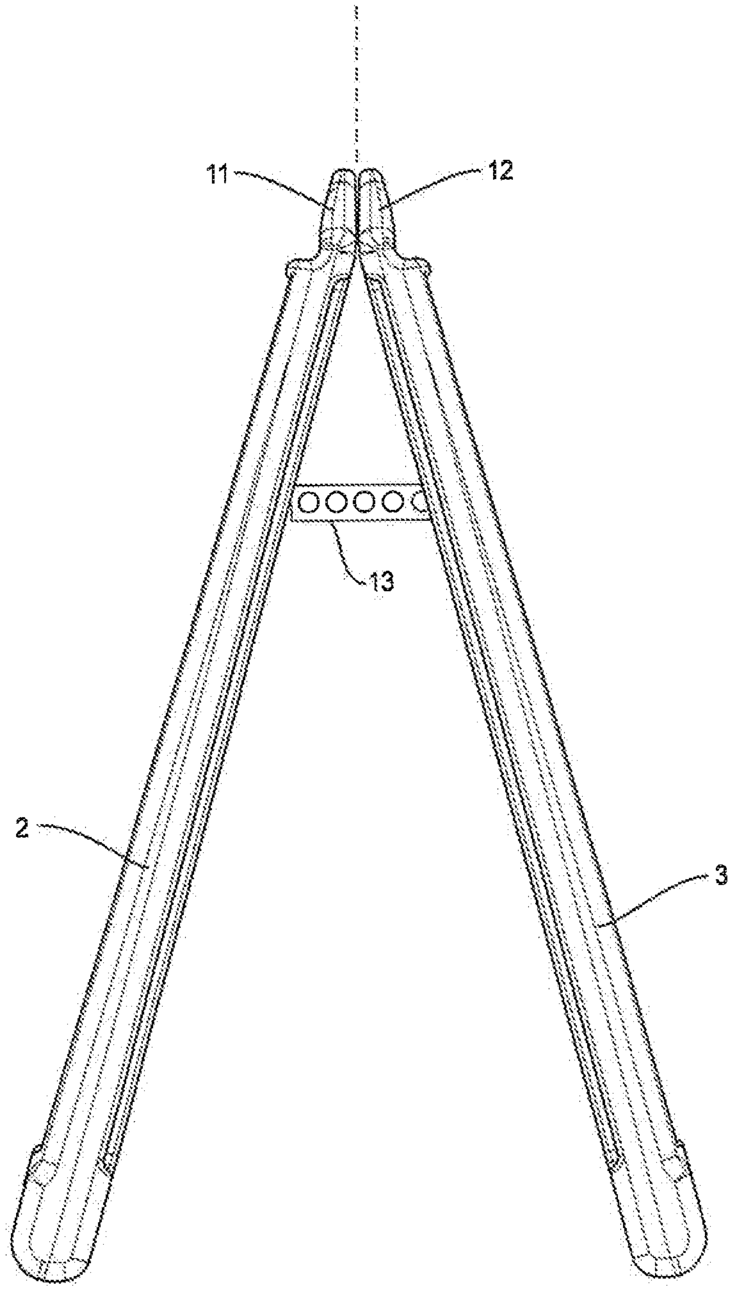
FIG. 6 is a side elevational view of the A-frame support in opened position shown in FIG. 1.
Figure 7:
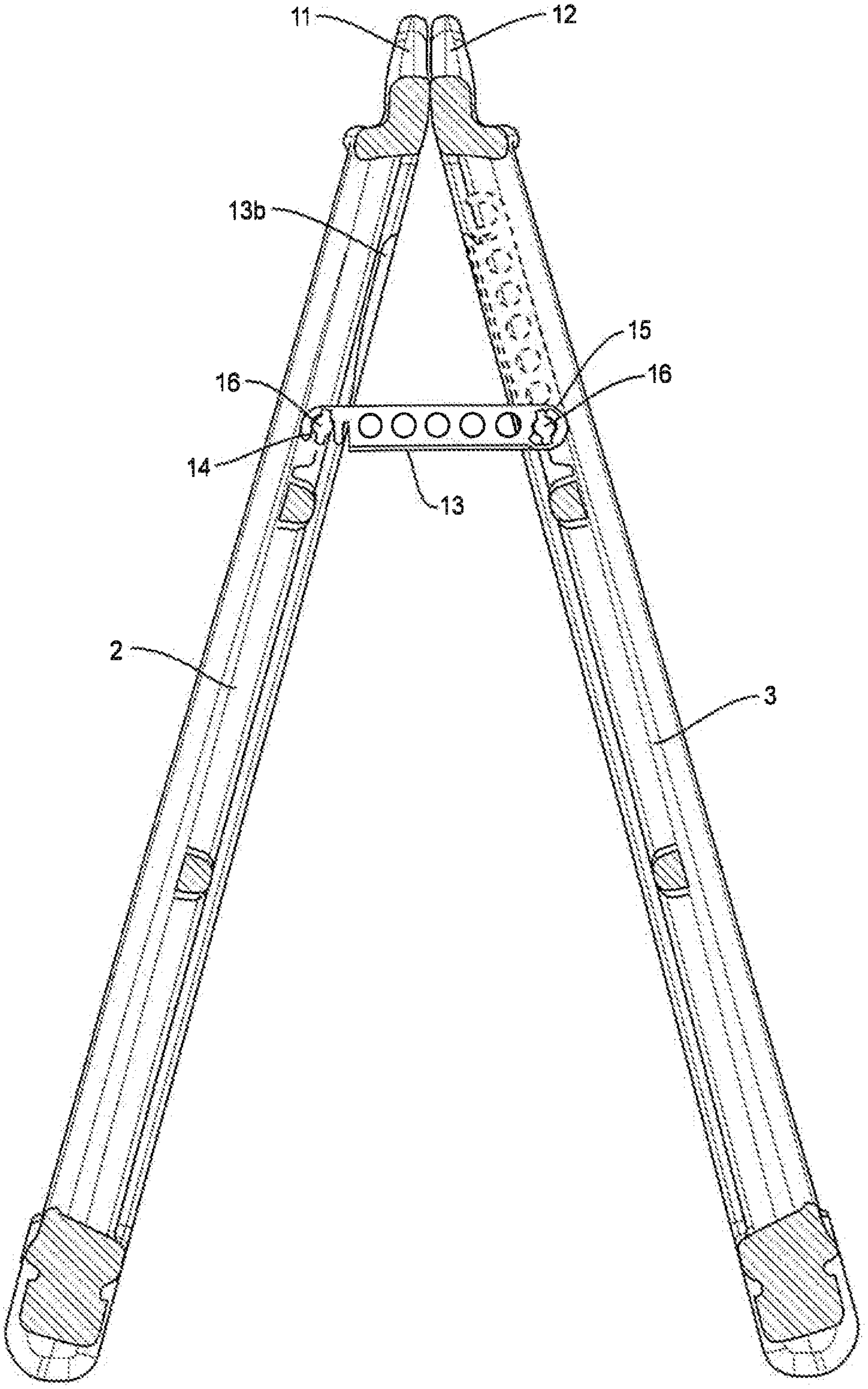
FIG. 7 is a sectional view along line 7-7 in FIG. 3.
Figure 11A:
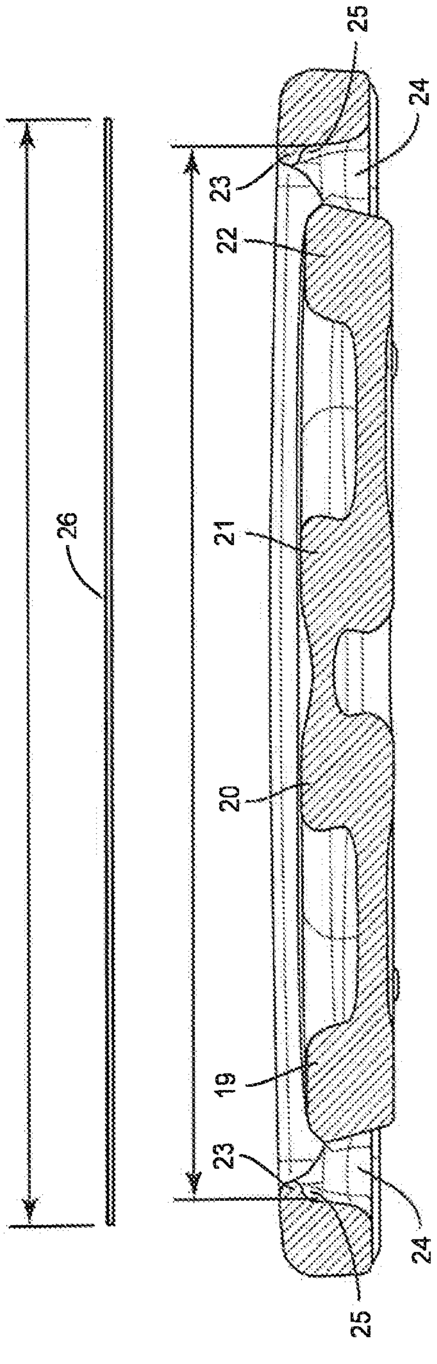
FIG. 11A is a sectional view along line 11A-11A in FIG. 3.
Figure 11B:
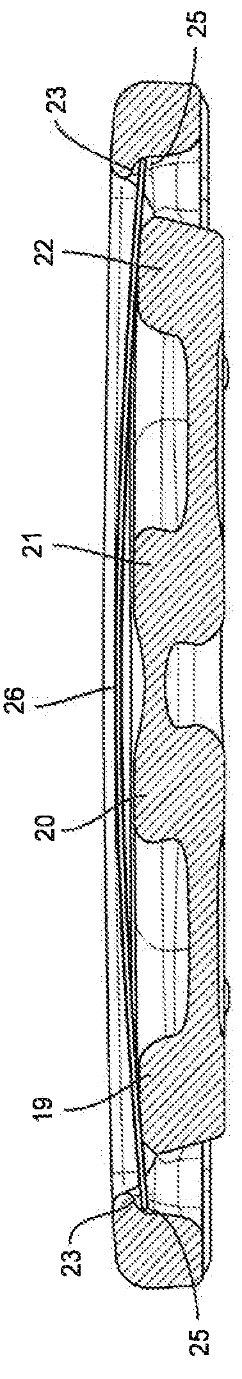
FIG. 11B is a sectional view similar to FIG. 11A and schematically showing insertion of a sign in the panel.
Figure 12:
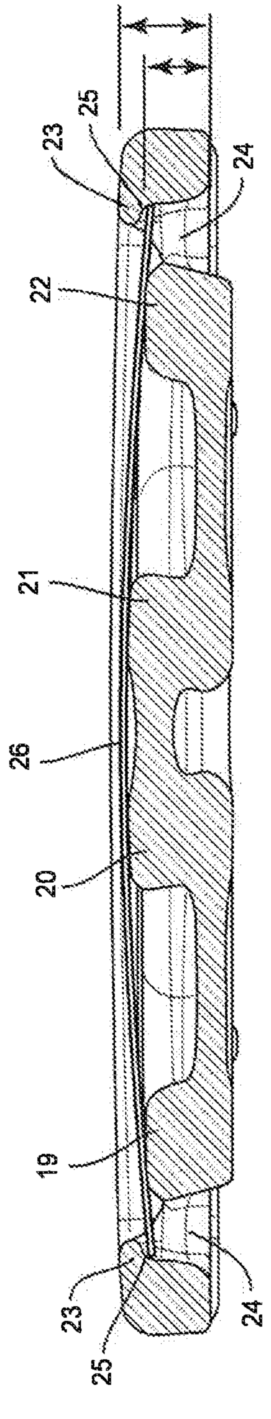
FIG. 12 is a sectional view similar to FIG. 11B and showing a panel having a surface of slightly different curvature.
Figure 13:
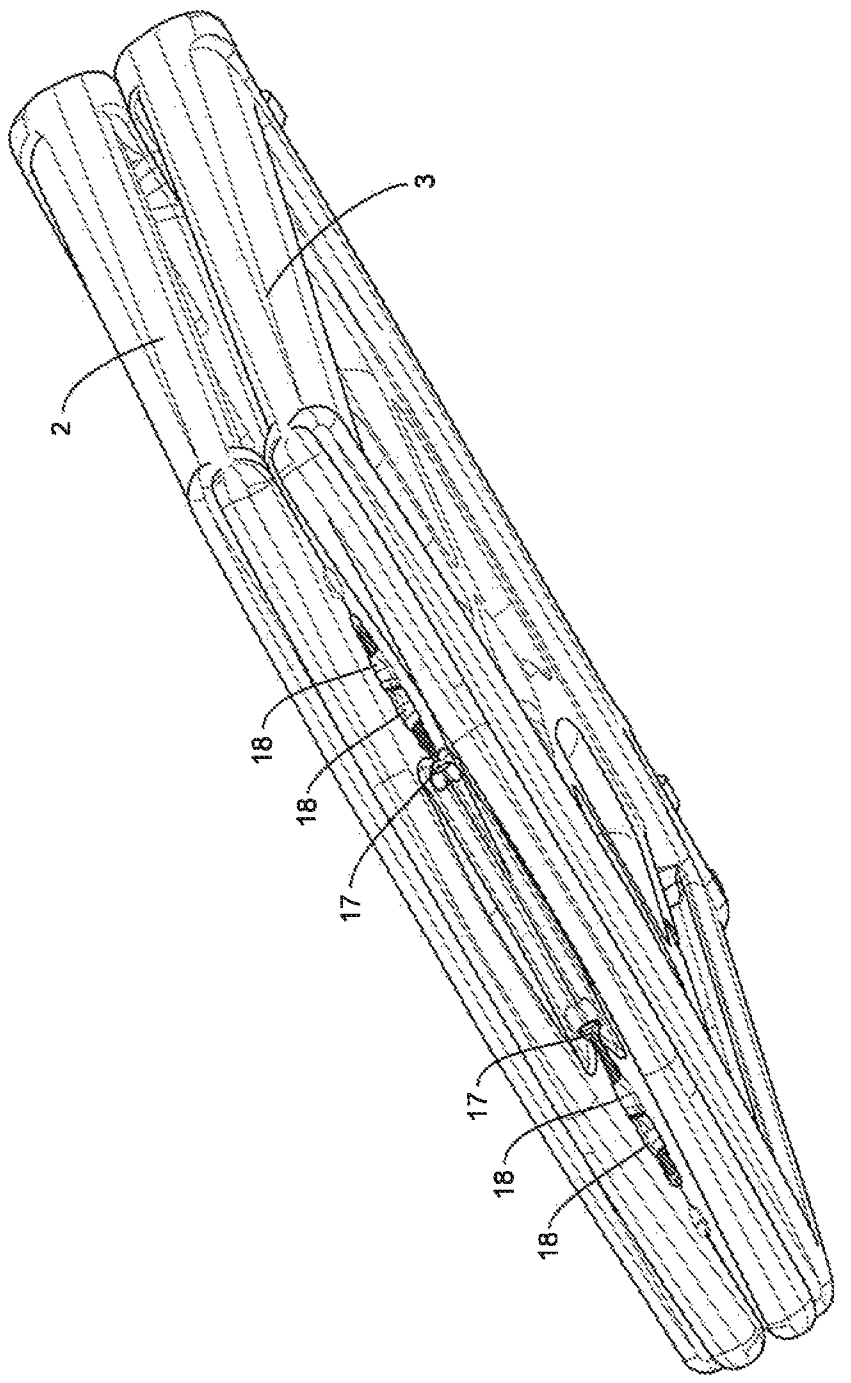
FIG. 13 is top perspective view of the stand in a closed position showing the hinge and pin assembly.
Figure 14A:
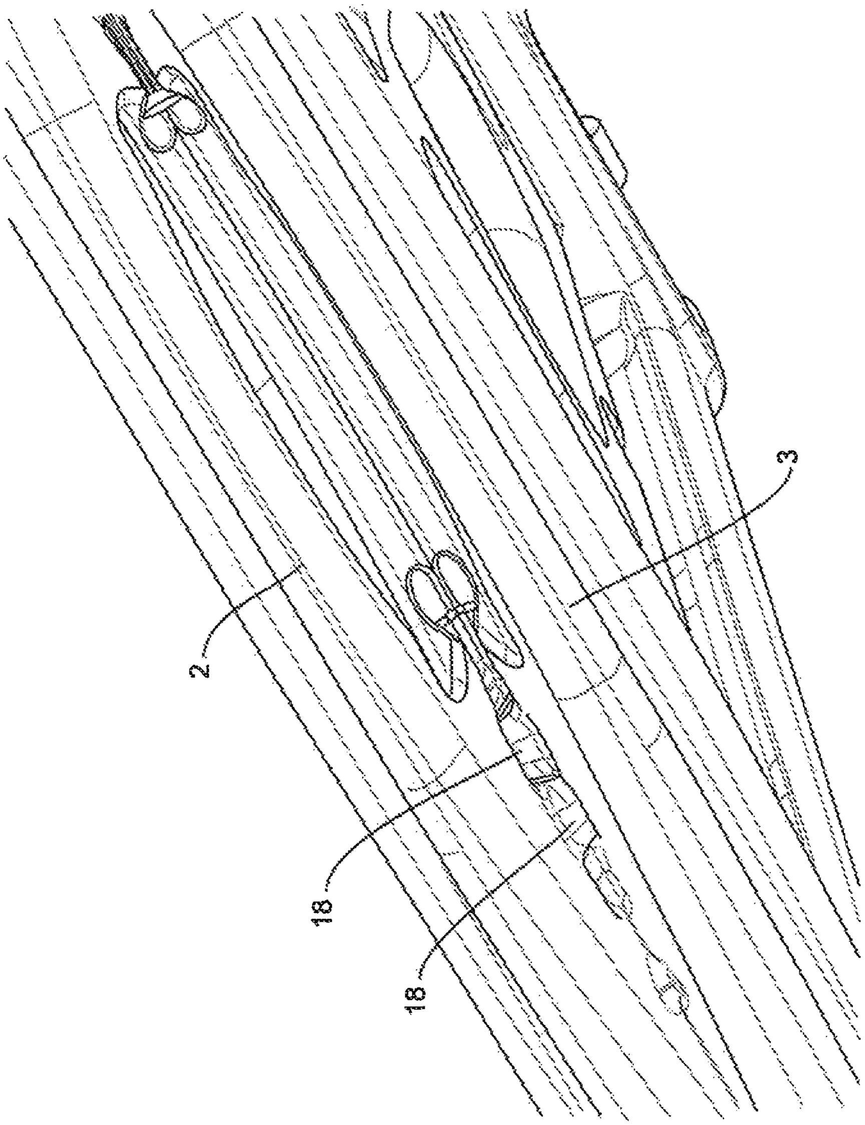
FIGS. 14A and 14B are perspective views of the hinge and pin assembly.
Figure 14B:
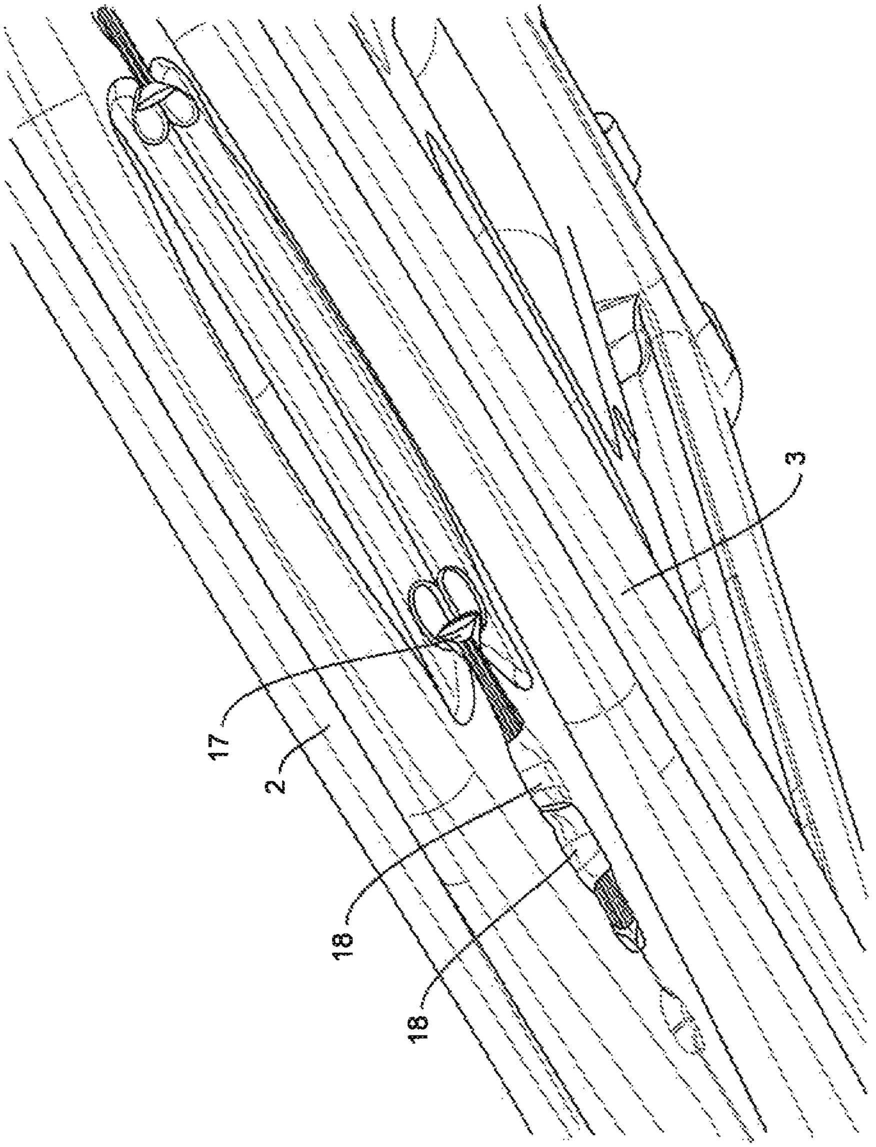

Outer edges of each panel 2, 3 on sides of the series of rectangularly-extending holes 24, 25 opposite the other holes 4-10 define lips 23 for capturing and securing a sign or display positioned upon the curved surface of each panel 2, 3 (FIGS. 11A, 11B and 12). The tops 11, 12 of the respective panels 2, 3 are each angled in a different direction from the rest of the respective panels 2, 3 (FIG. 5), such that the tops 11, 12 contact one another when the panels 2, 3 are pivoted outwardly as shown in FIGS. 6 and 7, to prevent the panels 2, 3 from pivoting beyond a defined acute angle with respect to one another and thus stabilizing the opened A-frame support 1. Each panel 2, 3 of the A-frame support 1 also has a pair of receptacles at the bottom thereof for receiving and securing wheels; other means and methods for connecting wheels to the panels are contemplated.

A hinge at the top of the A-frame panels 2, 3 pivotally couples the panels 2, 3 together, and is constituted by two hinge pieces 11, 12 each formed at the top of the respective A-frame panel 2, 3, and pivotally securable to one another. Each hinge piece 11, 12 extends at an angle with respect to a remainder of the respective A-frame panel 2, 3 as best seen in FIG. 5 where the A-frame support 1 is closed and the front and back panels 2, 3 abut one another. As shown in FIG. 5, the hinge pieces 11, 12 can only be pivoted a short angle (smaller double-headed arrows) before abutting one another as shown in FIGS. 6 and 7 illustrating the A-frame 1 in maximum opened position. The maximum angle the hinge pieces 11, 12 can be pivoted before abutting, and therefore the maximum angle the panels 2, 3 can be pivoted away from one another, is denoted by the larger double headed arrow in FIG. 5. However, the panels 2,3 can be pivoted and secured at smaller acute angles, as described further infra.

Figure 10A:
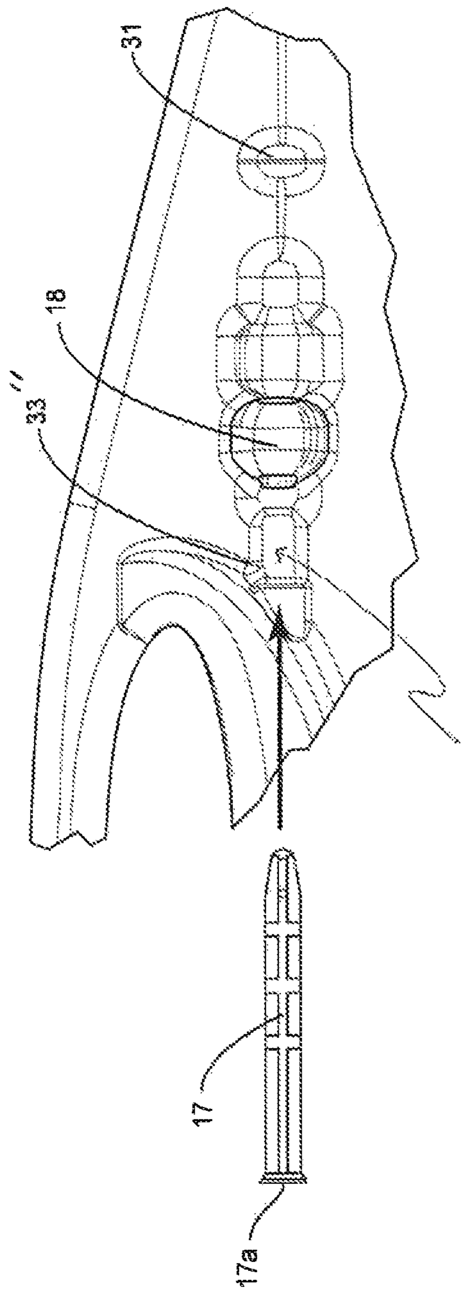
FIG. 10A is a schematic partial plan corner view of the panel and showing a coupling pin.

As illustrated in the drawings, the hinge pieces 11, 12 of the A-frame 1 support has two separate channels 40 at opposite upper corners where the hinge pieces 11, 12 meet the respective panels 2, 3 to which the hinge pieces are formed. At these respective channels 40, each hinge piece 11, 12 comprises at least one grommet 18 (FIGS. 10A and 10B) which are aligned when the panels abut one another in closed position (FIG. 5) and the grommet 18 are mated into a respective channel 40.

Figure 10B:
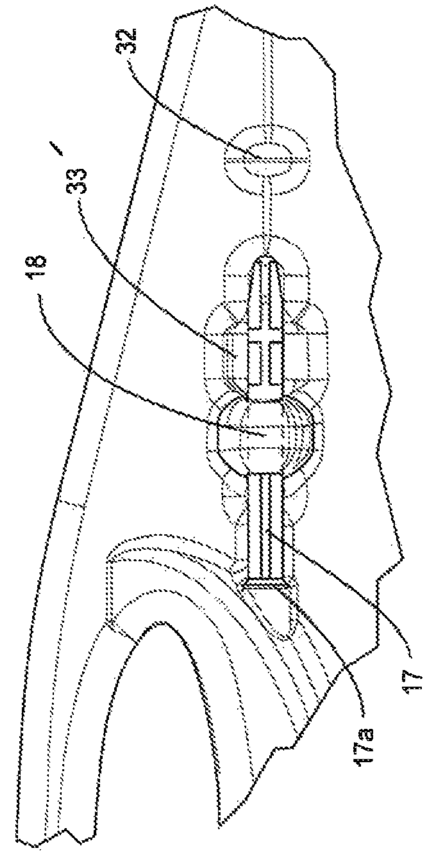
FIG. 10B is a schematic partial plan corner view similar to FIG. 10A and showing insertion of and coupling by the pin.

As shown in FIGS. 10A, 10B, 13, 14A and 14B, when panels 2 and 3 are mated together, grommets 18 mate with channels 40, and in the folded and closed position, a pin 17 can be snapped into the respective grommets 18 at either corner and pivotally secure the hinge pieces 11, 12 and respective panels 2, 3 together. Pin 17 has a waffle-like grid contour, with a head thereof seating in a recess formed in the defined channel on one side of the grommet 18, and a tip thereof abutting a stop situated on an opposite side of the grommet 18, to pivotally secure the panels 2, 3 with hinge pieces 11, 12 together as shown in FIG. 10B. Pin 17 can be removed from the channel and respective grommets 18 by snapping the head thereof in an opposite direction from the stop. Furthermore, a clip may be provided to couple tops of the hinge pieces 11, 12 in abutting relation with respect to one another, such that the respective A-frame panels are positioned in angularly-flared orientation.

As shown in the drawings, the pivot register system according to the present invention utilizes mating recesses 31, 32 and bumps 33' to maintain alignment of the sign legs 2, 3 when assembled and opened or closed. The preferred location of the pivot registers is outside the hinges.

While the drawings illustrate two pivot registers (positioned on either side of the handles at the top of the legs), more than two such registers can be provided. The hinge pieces 11, 12 themselves are hidden on the back side of the respective panels or legs 2, 3 to be shielded from view and avoid being damaged. While two hinge segments are illustrated in the drawings, more than two segments can be provided.

The cross-section of the pivot pin 17 enhances strength and moldability. The tapered end of the pivot pin 17 allows the pin 17 to easily slide over or through the hinge components during assembly. This pin 17 locks into place as shown, with the head 17*a* thereof recessed in a depression 33" of the respective panels, to prevent inadvertent removal.

As illustrated in FIGS. 4 and 6-8, once the panels 2, 3 have been pivoted open to an appropriate extent, the panel 2, 3 can be braced open at an appropriate angle with respect to one another by clipping a bar 13 having a hook 14 on one end around a projection 16 positioned on one of the panels 2 as best seen in FIG. 7. A similar configuration is shown on the opposite side in the preferred embodiment, but noting only one is required for operation; the second can be provided for more support and strength to the opened support.

The bar 13 is provided with a flange 13*a* positioned along an end of the bar 13. The bar 13 has an encircled hole 15 at an opposite end which is clipped on a projection 16 on the opposite panel 3, to brace the panels 2, 3 open with respect to one another. When the panels 2, 3 are closed (FIG. 5) or uncoupled and separated from one another, the bar 13 can be positioned up into the opening with the flange 13*a* fitted into a receptacle 13*b*, which permits panels 2 and 3 to fully close upon each other, and so there is no danger of the bar 13 separating and being lost. In particular, the brace or bar 13 is coupled through the hole 15 receiving the concomitant projections or stud 16 before the legs or panels 2, 3 are coupled together, to keep the brace or bar 13 permanently attached to one of the panels 3.

Figure 8:
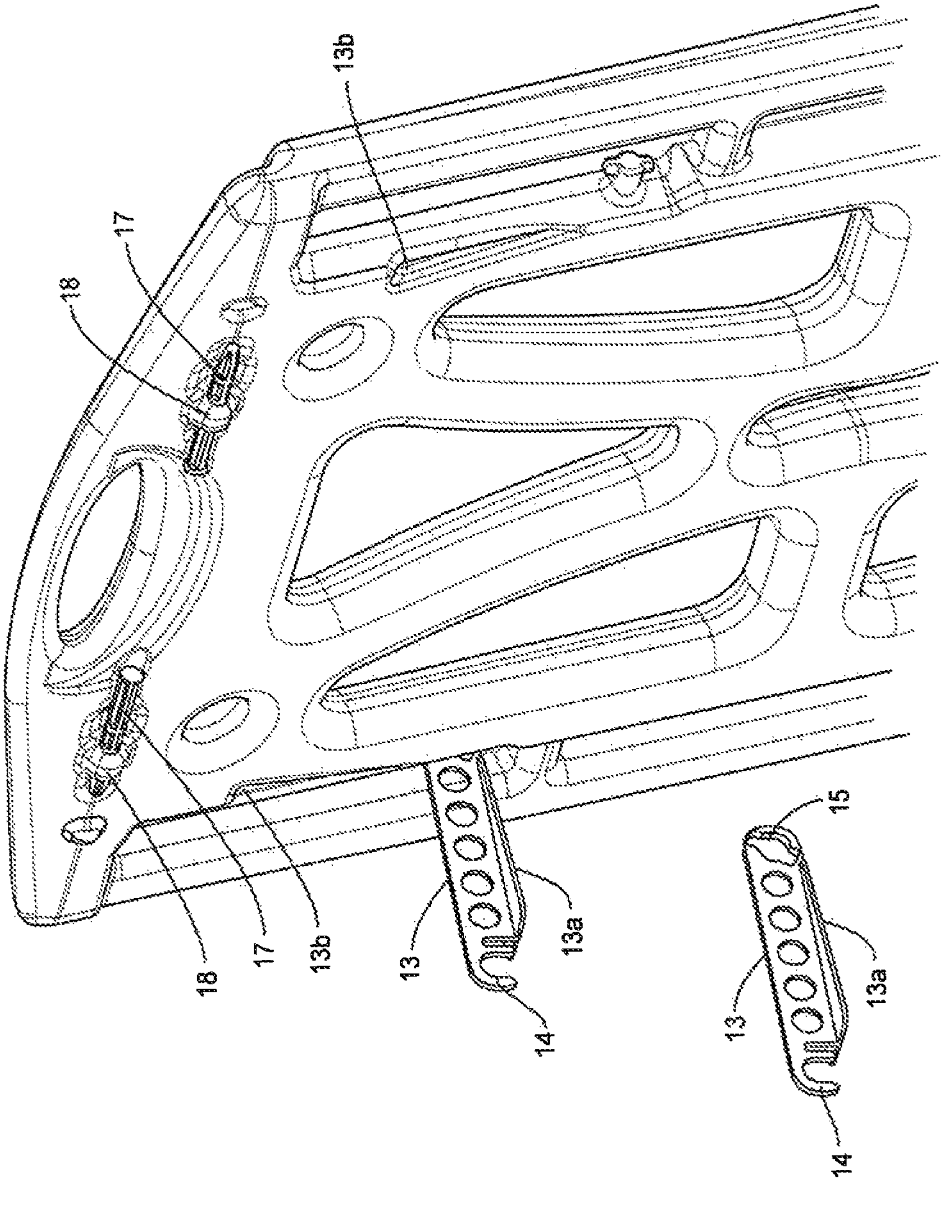
FIG. 8 is a partial exploded perspective view of the panel of the A-frame support.
Figure 9:
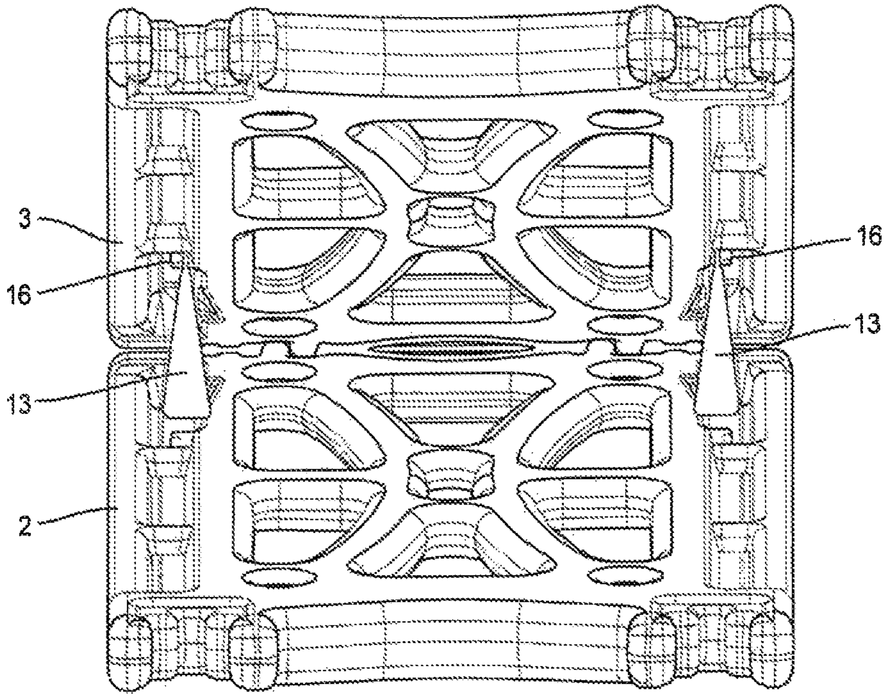
FIG. 9 is a bottom plan view of the A-frame support of FIGS. 1, 6 and 7 in opened position.

In this regard, the hole 15 in the bar 13 and concomitant projection 16 can possess complementary configuration as shown in FIGS. 7 and 8. Then, when the hole 15 is received on the projection 14 and then turned as shown in FIG. 7, there is no danger of the bar 13 separating from the panel 3. A series of projections 16 can be arranged along an inside of each panel 2, 3 and a series of bars 13 of different length can be provided, to allow securing of the A-frame support 1 at different acute angles.

Furthermore, the bar 13 itself may have a series of holes between the hook 14 and hole 15 at the opposite ends thereof. The projections 16 are each formed as a stud with T-shaped formation as best seen in FIG. 7, and with the hole 15 possessing a complementary T-shaped configuration. Then, when the A-frame is opened as shown in FIG. 7, the bar 13 and hole 15 turn with respect to the projection 16 on which the hole 15 is placed, to help retain the A-frame in opened condition.

The series of holes along the bar or brace 13 reduces weight of the individual bar 13, improves molding of the bar 13 and adds strength. The flange 13*b* can be provided along the bottom of the bar 13 to serve as a handle for coupling and de-coupling the legs or panels 2, 3 together. As shown in FIG. 8, the flared shape of the flange 13*b* of the bar 13 provides easier gripping, and acts as a visual indicator of where to grab. A slot is also provided just behind the U-shaped hook 14 as shown in FIGS. 7 and 8, to act as a spring to ensure proper tension between the brace or bar 13 and stud or projection 16 for firm engagement.

As illustrated in FIGS. 11A and 11B, the inner ridges 20, 21 of the outer curved surface of each panel 2, 3 are elevated in cross-section with respect to outer ridges 19, 22, to form the curved surface for receiving and securing the sign or display. As schematically shown, the sign or display 26 is bowed and edges snapped underneath the lips 23 along the respective holes 24 and 25 to secure the sign or display 26. FIG. 12 illustrates a view similar to FIG. 11B, but with the inner ridges 20, 21 elevated at a greater height with respect to the outer ridges 19, 22, to accommodate and secure a sign or display having greater curvature.

In other words, these various features of each surface of the A-frame leg or panel cooperate to form a recess underneath the respective lips 23 to receive the edges of the respective sign 26 along the vertical channel 25 and bow or flex the sign 16 to engage with requisite tension. These recessed channels are shaped to allow for slight variation in width of the sign 26 face by supporting either the outside edge of the sign face or front edge of the sign face. The bottom of each panel 2, 3 forms a shelf to support the bottom of the sign 26 face. These vertical, recessed channels 25 create outside ribs which are configured and supported to prevent undue bowing or warping of the sign 26 itself. This is attained by providing recessed tie-backs 24 as best seen, e.g., in FIGS. 3 and 4, thus creating a continuous channel 25 and avoiding need for the sign 26 faces themselves to require notches cut into the outside edges thereof.

Curving the sign 26 face naturally increases viewing visibility from a sideways direction. Since the sign 26 is secured to the leg or panel 2, 3 with a curved shaped, the flexible sign 26 is under continuous tension which prevents unauthorized removal, in addition to diverting wind away from the A-frame assembly, thereby increasing stability.

Figure 15B:
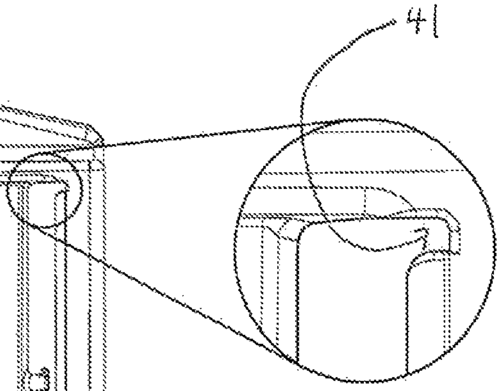
FIGS. 15B and 15C are enlarged views of the respectively encircled areas on FIG. 15A.
Figure 15A:
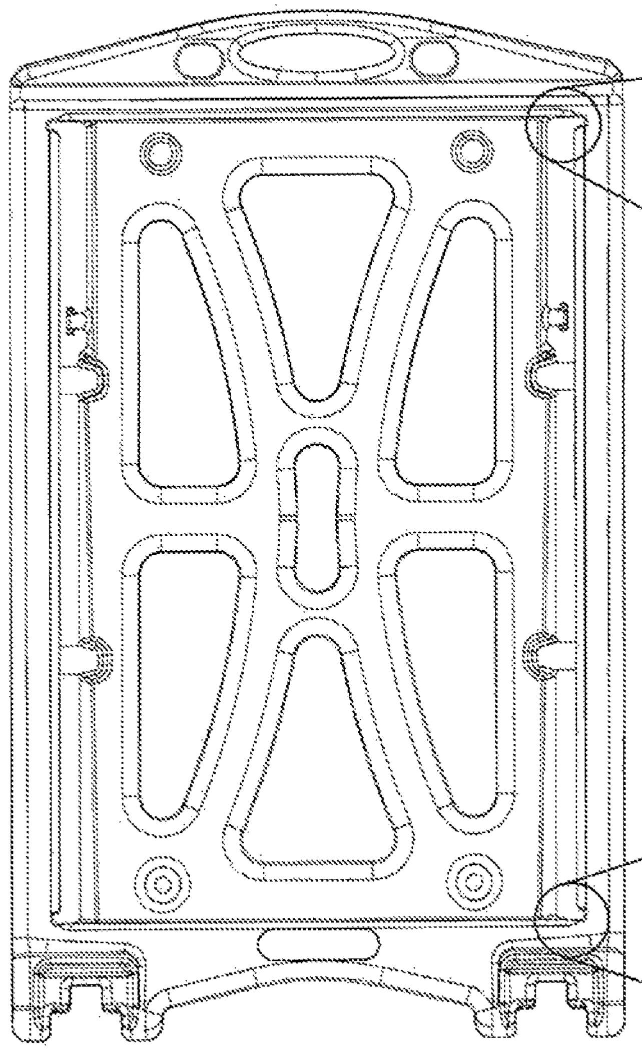
FIG. 15A is a front elevational view of a modification of the panel forming the A-frame support.
Figure 15C:
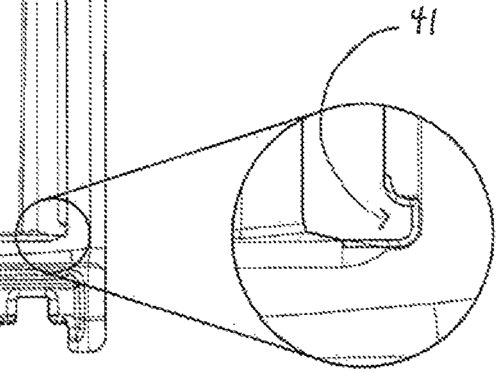

As shown in FIGS. 15A-15C, laterally-extending notches or indentations 41 can be provided at the tops and bottoms of the respective holes 25, to make it easier to secure and remove the sign 26 onto or from the respective panels 3 or 4.

Wheels can be added to each sign leg 2, 3 by a variety of different designs, including clip-on features. With wheels, the sign can be rolled in either folded or opened condition, because the two individual handles at the top of the legs or panels 2, 3 touch to create a large handle without pinching when open, and discrete handles when closed.

This A-frame assembly has a minimum of individual components and no loose parts after assembling, eliminating all exposed hardware and presenting a clean look. Sharp, pointy edges are also eliminated, improving safety.

All components of the present invention can be formed from molded or extruded durable hard plastic, including the pin 17 and bracing bar 13, which withstands all types of weather conditions including wind up to 30 mph. At the same time, weathering conditions such as rusting which would be encountered with heavier, more expensive metallic components, is avoided. Warping or unwanted flexing of the components is minimized by being formed from hard plastic.

The features of the present invention are merely exemplary and not intended to limit the scope thereof in any way.

Where this application has listed the steps of a method or procedure in a specific order, it may be possible, or even expedient in certain circumstances, to change the order in which some steps are performed, and it is intended that the particular steps of the method or procedure claim set forth here below not be construed as being order-specific unless such order specificity is expressly stated in the claims.

While the embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A hinge for coupling and securing two panels in A-frame configuration together, and comprising:

two hinge pieces each formed at the top of a respective A-frame panel and securable to one another, with each said hinge piece extending at an angle with respect to a remainder of the A-frame panel, and comprising a channel extending along a respective panel inwardly from a corner of the respective panel where the angled hinge piece meets the respective panel to which the hinge piece is formed, and at least one grommet extending around said respective channel, such that said grommets of the hinge pieces align only when the panels abut one another in closed position, and additionally comprising a pin arranged to seat through said grommets and along said channels of both said hinge pieces and pivotally couple said hinge pieces together, when said respective grommets are aligned, to secure the panels together in closed position, and be removed from said grommets and channels to allow the panels to pivot outwardly from one another.

2. The hinge of claim 1, comprising two pins each arranged to seat through respective grommets of said hinge pieces when aligned.

3. The hinge of claim 2, wherein said channels defined by said two hinge pieces along a respective panel are discontinuous when the panels are in closed position.

4. The hinge of claim 1, wherein said channels and grommets are directly formed at a top of the respective panels and do not define a pivotal axis of the panels.

5. The hinge of claim 4, wherein one of said channels comprises a stop at one end thereof, and the other of said channels comprises a recess at an end thereof opposite the stop of said one channel, when the panels are in closed position.

6. The hinge of claim 5, wherein said pin has a waffle-like grid contour with a head thereof arranged to seat in the recess situated on one side of the grommets and a tip thereof arranged to abut the stop on the other side of the grommets, to secure the panels in closed position.

7. The hinge of claim 6, wherein said pin is configured to snap through the respective grommets to secure the panels in closed position, and be removed from the grommets by snapping the head thereof in a direction opposite the stop to allow the panels to be pivoted outwardly from one another.

8. The hinge of claim 1, additionally comprising mating recesses and bumps to maintain alignment of the panels when opened or closed.

9. The hinge of claim 1, additionally comprising a clip bar having a hook at one end and an encircled opening at an opposite end, said hook arranged to hook onto projections along each said panel to brace said panels in an angular position with respect to one another and said clip bar retained on and hanging from said panel on which said encircled end receives a projection when said panels are uncoupled.

* * * * *